(12) United States Patent
Knadle, Jr. et al.

(10) Patent No.: US 7,259,676 B2
(45) Date of Patent: Aug. 21, 2007

(54) MODE-DIVERSITY RFAID TAG AND INTERROGATOR SYSTEM AND METHOD FOR IDENTIFYING AN RFAID TRANSPONDER

(75) Inventors: Richard T. Knadle, Jr., Dix Hills, NY (US); Mark William Duron, East Patchogue, NY (US)

(73) Assignee: Symbol Technologies, Inc., Holtsville, NY (US)

(*) Notice: Subject to any disclaimer, the term of this patent is extended or adjusted under 35 U.S.C. 154(b) by 263 days.

(21) Appl. No.: 11/142,054

(22) Filed: May 31, 2005

(65) Prior Publication Data

US 2006/0267772 A1    Nov. 30, 2006

(51) Int. Cl.
*G08B 13/14* (2006.01)
(52) U.S. Cl. ............... 340/572.4; 340/572.1; 340/573.1
(58) Field of Classification Search ............ 340/572.1, 340/572.2, 572.4, 568.1, 571, 573.1, 573.2, 340/573.3, 573.4, 573.7, 539.11, 539.13, 340/539.15; 310/313 R
See application file for complete search history.

(56) References Cited

U.S. PATENT DOCUMENTS

| | | | |
|---|---|---|---|
| 4,656,463 A | | 4/1987 | Anders et al. |
| 5,051,741 A | * | 9/1991 | Wesby .................. 340/825.49 |
| 5,528,232 A | | 6/1996 | Verma et al. |
| 5,767,792 A | | 6/1998 | Urbas et al. |
| 6,060,815 A | * | 5/2000 | Nysen ........................ 310/318 |
| 6,127,942 A | * | 10/2000 | Welle ..................... 340/870.16 |
| 6,208,062 B1 | * | 3/2001 | Nysen et al. ........... 310/313 R |
| 6,433,689 B1 | * | 8/2002 | Hovind et al. ........... 340/573.1 |
| 7,132,778 B1 | * | 11/2006 | Nysen et al. ........... 310/313 D |
| 2002/0145534 A1 | | 10/2002 | Dempsey | |

FOREIGN PATENT DOCUMENTS

| | | |
|---|---|---|
| DE | 199 56 908 | 7/2000 |
| WO | WO 02/30706 | 4/2002 |
| WO | WO 2004/051304 A1 * | 6/2004 |

OTHER PUBLICATIONS

International Search Report for International Application No. PCT/US2006/020881, mailed Oct. 10, 2006.

* cited by examiner

*Primary Examiner*—Van T. Trieu
(74) *Attorney, Agent, or Firm*—Ingrassia, Fisher & Lorenz, P.C.

(57) ABSTRACT

Methods and apparatus are provided for mode diversity radio frequency identification (RFAID). The apparatus comprises a first transducer configured to receive a first radio frequency (RF) signal, a second transducer configured to receive an acoustic signal, and an impedance modulator coupled to the first transducer and the second transducer and configured to emit a signal identifying an RFAID tag when the first transducer receives the first RF signal and/or the second transducer receives the acoustic signal. The method comprises transmitting an RF signal and an acoustic frequency signal, and detecting a first modulated signal indicating an RFAID transponder. The first modulated signal is based on one of the RF signal and the acoustic signal.

20 Claims, 2 Drawing Sheets

MODE-DIVERSITY RFAID TAG AND INTERROGATOR SYSTEM AND METHOD FOR IDENTIFYING AN RFAID TRANSPONDER

FIELD OF THE INVENTION

The present invention generally relates to contactless identification systems, and more particularly relates to Radio Frequency Identification (RFID) systems and methods for identifying RFID transponders.

BACKGROUND OF THE INVENTION

RFID systems have been used to manage and track inventory in consumer retail stores and other businesses having large inventories. In a typical asset-tracking application, an RFID system includes at least one RFID reader and at least one RFID tag, and the RFID tag may be placed upon the asset to be tracked. An RFID tag has stored data, such as stored in an RFID tag memory, that identifies the tag, and the RFID tag typically transmits the stored data, such as stored in an RFID tag memory in response to a time varying Radio Frequency (RF) wave transmitted by an RFID reader. RFID tags generally fall into two categories: semi-passive or active tags that include an on-board power source (e.g., a battery); and passive tags that draw power from the RFID reader via the radio frequency carrier wave transmitted from the RFID reader.

In a passive RFID tag, the time varying radio frequency carrier wave powers the passive RFID tag by generating an AC voltage across the antenna of the passive RFID tag. The AC voltage is typically rectified to a DC voltage, and the DC voltage builds until the DC voltage reaches a minimum operating DC voltage to activate the passive RFID tag. Once activated, the RFID tag can transmit the stored data such as by modulated backscattering of the carrier wave received from the RFID reader. The RFID tag backscatters by changing the amplitude and/or phase of the RF carrier wave from the RFID reader and modulates the RF carrier wave by altering the load impedance of the RFID tag antenna.

RFID systems typically utilize frequencies that are within one of several frequency ranges including a low frequency range (e.g., from about 30 kHz to about 300 kHz), a high frequency range (e.g., from about 3 MHz to about 30 MHz), an ultra high frequency range (e.g., from about 300 MHz to about 3 GHz), and a microwave range (e.g., greater than about 3 GHz). Although these frequency ranges are commonly used, other frequency ranges may also be used. The assigned frequency range is often channelized (e.g., split into multiple channels) to allow simultaneous operation of multiple RFID readers.

Despite having frequency diversity (e.g., multiple RF frequency bands of operation), variations in RFID tag orientation and RF multipath propagation may decrease the read probability of the RFID tag. Some factors that typically decrease the read probability of an RFID tag include the orientation of the RFID tag with reference to the RFID reader (e.g., an RFID reader positioned off the end of an RFID tag antenna), cross polarization (e.g., a vertically oriented RFID tag with a horizontally polarized RFID reader signal), location of the RFID tag behind an electromagnetically absorptive or reflective product, location of the RFID tag within a signal null of a reflective environment, and location of the RFID tag within a cross-polarized null region when a circular polarized RFID reader signal undergoes multipath reflection (e.g., an RFID reader transmitted clockwise signal and a reflected counterclockwise signal may combine to create a primarily linear polarized signal that is cross-polarized to the RFID tag).

Common surfaces associated with storing or displaying inventory, such as flooring or shelving, may reflect the radio frequency carrier waves transmitted from the RFID reader to produce the multipath null. Each carrier wave frequency band has a substantially limited frequency range of operation. For example, a 915 MHz frequency band has a range of about 2.8% frequency difference (e.g., from about 902 MHz to about 928 MHz) for operation. This swept-frequency characteristic of the RFID reader causes the multipath null to move but to a slight degree. The read probability may further decrease as the distance decreases between the RFID tag and the reflecting surface. For example, the close proximity between the reflecting surface and the RFID tag may create partial shielding of the RFID reader transmitted signal and further decrease any movement of the multipath null. In the latter case, the multipath null is not likely to move far enough to bring the tag reception signal above the threshold for RFID tag response.

Accordingly, it is desirable to provide an RFID tag and reader system that minimizes reading interference resulting from variations in RFID tag orientation and RF multipath propagation. In addition, it is desirable to provide an RFID tag and reader system having a mode diversity that operates with a variety of signal reflecting/absorbing tagged assets and in a variety of signal reflecting/absorbing environments. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

System and methods are provided for mode diversity Radio Frequency and Acoustic Identification (RFAID) having mode diversity. In an exemplary embodiment, an RFAID tag is provided having mode diversity. The RFAID tag comprises a first transducer configured to receive a first Radio Frequency (RF) signal, a second transducer configured to receive an acoustic signal, and an impedance modulator coupled to the first transducer and the second transducer and configured to emit a signal identifying an RFAID tag when the first transducer receives the first RF signal and/or the second transducer receives the acoustic signal.

In another exemplary embodiment, an RFAID reader is provided for identifying an RFAID transponder. The RFAID reader comprises a transceiver and a processor coupled to the transceiver. The transceiver is configured to transmit an RF signal and an acoustic signal, and receive a modulated signal from the RFAID transponder based on at least one of the RF signal and the acoustic signal. The processor is configured to identify the RFAID transponder from the data signal.

In another exemplary embodiment, a method is provided for detecting an RFAID transponder. The method comprises transmitting an RF signal and an acoustic signal, and detecting a first modulated signal indicating an RFAID transponder. The first modulated signal is based on at least one of the RF signal and the acoustic signal.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
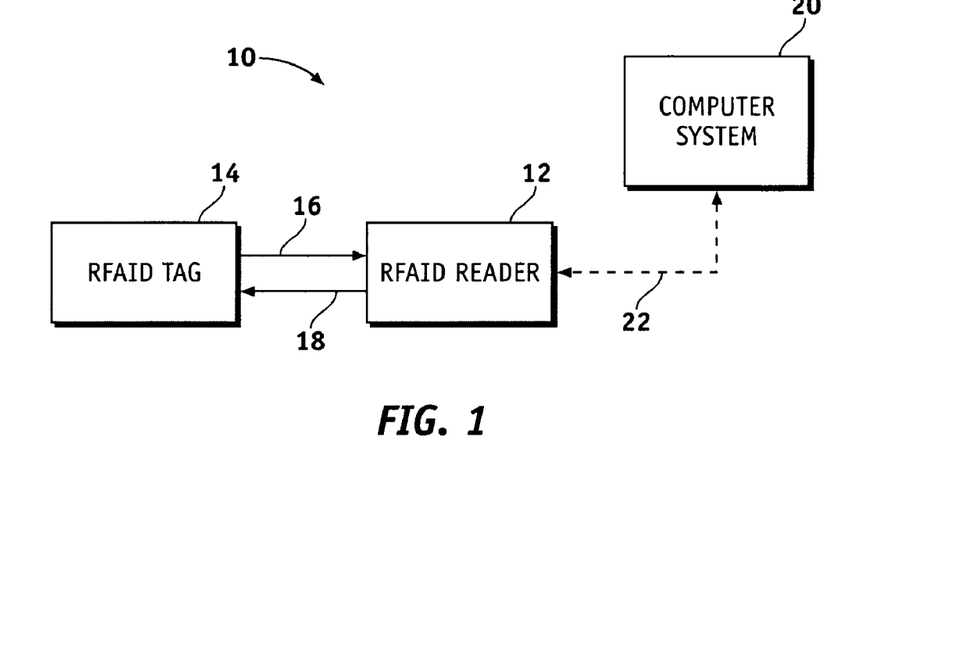
FIG. 1 is a block diagram of an RFAID system in accordance with an exemplary embodiment of the present invention.

FIG. 1 is a block diagram of a Radio Frequency and Acoustic Identification (RFAID) system 10 in accordance with an exemplary embodiment of the present invention. The RFAID system 10 comprises a mode-diversity RFAID reader 12 and at least one mode-diversity RFAID tag 14. The RFAID system 10 may also optionally include a computer system 20 coupled to the mode-diversity RFAID reader 12 via a connection 22 (e.g., a wireless connection such as in a wireless local area network). In an exemplary application, the mode-diversity RFAID tag 14 is located on any item or asset such as commonly used for conventional inventory tracking. To identify a mode-diversity RFAID tag, the mode-diversity RFAID reader 12 transmits an interrogation signal 18 in a magnetic field or electromagnetic field mode, an acoustic mode, or a combination electromagnetic and acoustic mode. The mode-diversity RFAID tag 14 has identification data, such as stored in a memory, that uniquely identifies the mode-diversity RFAID tag 14, and upon receipt of the interrogation signal 18, the mode-diversity RFAID tag 14 communicates the identification data to the mode-diversity RFAID reader 12 via a modulated signal 16 derived from the interrogation signal 18. The mode-diversity RFAID system 10 thus performs RFID, acoustic identification (ID), or a combination of RFID and acoustic ID. General examples of the categories of the mode-diversity RFAID tag 14 include, but are not necessarily limited to, a semi-passive or active tag (e.g., containing a local power source) and a passive tag (e.g., without containing a local power source).

Using the different modes of the RFAID system 10 generally improves the range and read reliability performance between the mode-diversity RFAID reader 12 and the mode-diversity RFAID tag 14, and minimizes reading interference and/or signal nulling resulting from variations in RFAID tag orientation, location, and Radio Frequency (RF) or Acoustic Frequency (AF) multipath propagation. In the electromagnetic mode, the interrogation signal 18 comprises an RF carrier wave. In the acoustic mode, the interrogation signal 18 comprises an acoustic (e.g., ultrasonic frequency) carrier wave. In the combined electromagnetic and acoustic mode, the interrogation signal 18 comprises an RF carrier wave and an acoustic carrier wave. The interrogation signal may also include a command to the RFAID tag 14 indicative of a frequency or frequencies at which the RFAID tag 14 should modulate the interrogation signal 18 to produce a modulated signal 16. Although the mode-diversity RFAID tag 141 is described in the context of two primary modes (e.g., electromagnetic and acoustic), the mode-diversity RFAID tag 50 may also include a bar code and the mode-diversity RFAID reader 12 may also include a bar code reading element.

The mode-diversity RFAID tag 14 produces the modulated signal 16 based on the particular mode of the interrogation signal 18. For example, in the combined electromagnetic and acoustic mode, the modulated signal 16 comprises a modulated electromagnetic signal derived from the RF carrier wave and a modulated acoustic signal derived from the acoustic carrier wave, such as an acoustic transducer impedance modulation signal. Although the various modes are described with respect to a single frequency, the mode-diversity RFAID reader 12 may transmit interrogations signals in multiple frequencies for each of the different modes.

After receiving the modulated signal 16, the mode-diversity RFAID reader 12 may transfer the received identification data to the optional computer system 20 for data processing or performing other actions with the identification data, such as cataloging the identified mode-diversity RFAID tags for inventory control. The optional computer system 20 comprises a computer that can receive data from the mode-diversity RFAID reader 12 and that can perform some action on that data. In a point of sale application of the RFAID system 10, once the mode-diversity RFAID reader 12 receives a requested product code from a mode-diversity RFAID tag 14 affixed to a product, the mode-diversity RFAID reader 12 transfers this product code to the computer system 20. The computer system 20 may then perform a price lookup and generate an entry into a sales receipt. In an inventory control application of the RFAID system 10, the computer system 20 runs an inventory tracking software, and the mode-diversity RFAID reader 12 transfers any information gathered from the mode-diversity RFAID tags 14 to the computer system 20.

As previously mentioned, the general categories of the mode-diversity RFAID tag 14 include the passive, semi-passive, or active types, and the type of the mode-diversity RFAID tag 14 may be selected for different applications. In general, the semi-passive or active types of mode-diversity RFAID tags may be selected for greater range and higher reliability applications. In some applications, such as when the mode-diversity RFAID tag 14 is located in the presence of local RF absorbers or RF reflectors, the forward path or the reverse path (e.g., between the mode-diversity RFAID tag 14 and the mode-diversity RFAID reader 12) acoustic signal may have a greater reader range than the RF signal. In other applications, such as when the mode-diversity RFAID tag 14 is located in the presence of local acoustic absorbers that are RF transparent, the RF signal may have greater reader range.

Some examples of semi-passive and active type tag applications include, but are not necessarily limited to, an "Easy-Pass" toll-taking tag, a tag attached to a fork lift vehicle, and a tag attached to a pallet. Using a local power source, as in the case of a semi-passive (or active) mode-diversity RFAID tag, may significantly increase the RF or AF sensitivity of the forward path interrogation signal 18 from the mode-diversity RFAID reader 12. For example, using a local battery in the mode-diversity RFAID tag 14 generally increases the interrogation range of the mode-diversity RFAID tag 14 in RF, and the mode-diversity RFAID tag 14 can respond to the interrogation signal 18 by generating an acoustic transducer impedance modulation signal. Alternatively, when the interrogation signal 18 lacks an acoustic carrier signal, the mode-diversity RFAID tag 14 can respond to the interrogation signal 18 by generating an acoustic signal with power supplied by the local battery. Thus, by reading the reverse path signal or modulated signal 16 from the mode-diversity RFAID tag 14 in the mode with greater sensitivity (e.g., RF or AF), the mode-diversity RFAID system 10 adapts to a variety of environments prior to and subsequent to deployment of the interrogation signal 18.

Figure 2:
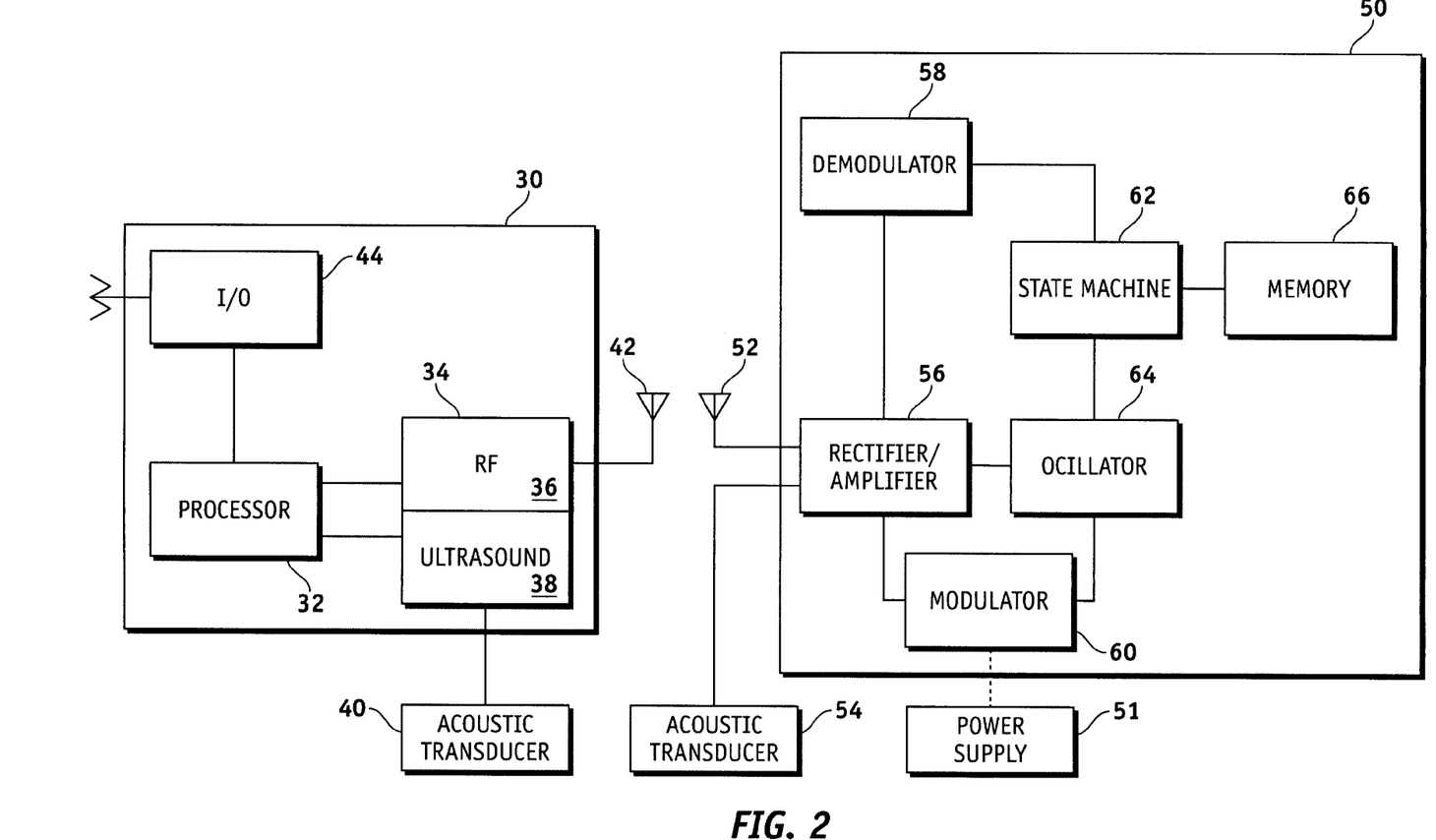
FIG. 2 is a block diagram of an RFAID reader and an RFAID tag in accordance with an exemplary embodiment of the present invention.

FIG. 2 is a block diagram of an RFAID reader 30 and an RFAID tag 50 in accordance with an exemplary embodiment of the present invention. The mode-diversity RFAID reader 30 comprises a processor 32, a transceiver 34 coupled to the processor 32 and having an RF processing unit 36 and an acoustic processing unit 38, an antenna 42 coupled to the RF processing unit 36, an acoustic transducer 40 coupled to the acoustic processing unit 38, and an Input/Output (I/O) device 44 coupled to the processor 32. The mode-diversity RFAID tag 50, the mode-diversity RFAID tag 50 comprises a voltage rectifier/amplifier 56, an antenna 52 coupled to the voltage rectifier/amplifier 56, an acoustic transducer 54 (e.g., an acoustic microphone) coupled to the voltage rectifier/amplifier 56, a signal demodulator 58 having an input coupled to the rectifier/amplifier 56, a state machine 62 having an input coupled to an output of the signal demodulator 58, an oscillator 64 having an input coupled to an output of the state machine 62 and having a first output coupled to the rectifier/amplifier 56, a signal modulator 60 having an input coupled to a second output of the oscillator 64 and having an output coupled to the rectifier/amplifier 56, and a memory 66 coupled to the state machine 62.

The processor 32 selects a particular interrogation mode (e.g., the electromagnetic mode, the acoustic mode, and the combination of electromagnetic and acoustic mode) and may be any processor, such as those processors conventionally used in RFID readers or other similar applications, and selects the frequency or frequencies of the interrogation signal. In the electromagnetic mode, as well as the electromagnetic portion of the combined electromagnetic and acoustic mode, the frequency of the electromagnetic mode may be selected from a variety of frequency ranges including, but not necessarily limited to, a low frequency range (e.g., from about 30 kHz to about 300 kHz), a medium frequency range (e.g., from about 300 kHz to about 3 MHz), a high frequency range (e.g., from about 3 MHz to about 30 MHz), an ultra high frequency range (e.g., from about 300 MHz to about 3 GHz), and a microwave range (e.g., greater than about 3 GHz). Although these frequency ranges are commonly used, other frequency ranges may also be used for the interrogation signal in the electromagnetic mode. The RF signal is preferably selected from about 125 KHz, about 13.56 MHz, about 868 MHz, about 915 MHz, about 2.45 GHz, and about 5.6 GHz, although other frequencies may be selected including, but not necessarily limited to, conventional European designated frequencies. In an exemplary embodiment, the transceiver 34 provides signal quality measurements to the processor 32. The processor 32 analyzes the signal quality measurements of the frequencies within the operating frequency range and selects the frequency or frequencies of the interrogation signal carrier wave. Alternatively, a signal strength indicator circuit (not shown) may provide the signal quality measurements to the processor 32. The processor 32 may additionally provide the transceiver 34 with proper commands to transmit to the RFAID tag 50.

The transceiver 34 scans a pre-determined frequency range used by the RFAID system 10 to determine the quality of individual frequency channels within the frequency range. For example, the transceiver 34 may scan an entire RF frequency range or, alternatively, scan a predetermined subset of frequencies within a frequency range corresponding to frequencies that may be used by the mode-diversity RFAID tag 50. The signal quality is determined from a signal to noise ratio for each frequency. Although the transceiver performs signal to noise ratio measurements to determine signal quality, a variety of other signal strength measurement techniques may be used by the transceiver 34 as appreciated by those of skill in the art. In an exemplary embodiment, the mode-diversity RFAID reader 30 operates with a Look Before Transmit (LBT) function during which the transceiver 34 scans each band of RF and/or AF frequencies. During application of the LBT function, the mode-diversity RFAID reader 30 scans each frequency channel, of each band of RF and/or AF frequencies, to determine the presence of signals from nearby readers in the frequency band. Selecting the frequency channel with lower or no signal transmissions near the same RF band from other readers generally minimizes potential distortion of the interrogation signal, such as a downward amplitude-modulated addressing signal, transmitted from the mode-diversity RFAID reader 30.

In addition to measuring signal quality, the transceiver 34 transmits interrogation signals to the mode-diversity RFAID tag 50 and receives modulated signals from the mode-diversity RFAID tag 50 via the antenna 42 and/or the acoustic transducer 40. The transceiver 34 includes any necessary circuitry for sending and receiving data, such as any modulation/demodulation circuitry and any encoding/decoding circuitry. In an exemplary embodiment, the transceiver 34 divides signal processing for the various modes (e.g., the electromagnetic mode, the acoustic mode, and the combined electromagnetic and acoustic mode) between the RF processing unit 36 and the acoustic processing unit. In the electromagnetic mode and combined electromagnetic and acoustic mode, the RF processing unit 36 transmits interrogation signals having an RF carrier wave, receives modulated RF signals from the mode-diversity RFAID tag 50 via the antenna 42, and processes the modulated RF signals to extract the identification data. In the acoustic mode and combined electromagnetic and acoustic mode, the acoustic processing unit 38 transmits interrogation signals having an acoustic (e.g., a sub-sonic, a sonic, or an ultrasonic frequency) carrier wave, receives modulated acoustic signals from the mode-diversity RFAID tag 50 via the acoustic transducer 40 (e.g., a piezoelectric transducer or an electret microphone), and processes the modulated acoustic signals to extract the identification data. The modulated signal(s) (e.g., the modulated RF signals and modulated acoustic signals) received by the transceiver 34 contain the identification data corresponding to the mode-diversity RFAID tag 50.

The transceiver 34 provides the processor 32 with the identification data, and the processor 32 may further process the identification data depending on a desired application. For example, the processor 32 may wirelessly transfer the identification data to the computer system 20 shown in FIG. 1 via the I/O device 44 for inventory control. The output device 44 can be any output device used by the mode-diversity RFAID reader 30 to display, store and/or transmit data received from the mode-diversity RFAID tag 50. Examples of the I/O device 44 include, but are not necessarily limited to, an RFAID reader display, a memory, a wireless transceiver in communication with a wireless local area network, and the like. The I/O device 44 can connect to the computer system 20 shown in FIG. 1 via the connection 22. In this exemplary embodiment, the connection 22 shown in FIG. 1 may be a wired or wireless connection.

In an exemplary embodiment of a passive (e.g., both RF and acoustic) mode-diversity RFAID tag 50, the voltage rectifier/amplifier 56 operates as a voltage rectifier. Additionally, in a passive or a semi-passive embodiment, the signal modulator 60 modulates the impedance, such as by modulating the resistive component of the impedance and/or modulating the reactive component of the impedance, at the antenna 52. In addition to the passive embodiment, the mode-diversity RFAID tag 50 may take a variety of semi-passive or active embodiments including, but not necessarily limited to, a semi-passive audio-to-RF embodiment, an active audio-to-RF embodiment, a semi-passive RF-to-audio embodiment, and an active RF-to-audio embodiment.

In the semi-passive or active embodiments of the mode-diversity RFAID tag 50, the voltage rectifier/amplifier 56 operates as an amplifier (e.g., an RF amplifier or an acoustic amplifier), and the mode-diversity RFAID tag 50 further comprises an optional power supply 51 coupled to the signal modulator 60. The mode-diversity RFAID reader 30 may communicate with the mode-diversity RFAID tag 50 in the electromagnetic mode via the antennas 42, 52, in the acoustic mode via the acoustic transducers 40, 54, or in the combined electromagnetic and acoustic mode via both of the antennas 42, 52 and the acoustic transducers 40, 54. In an exemplary embodiment of a semi-passive audio-to-RF mode-diversity RFAID tag 50, the acoustic transducer 54 is an acoustic microphone that receives an acoustic interrogation signal, the voltage rectifier/amplifier 56 is an acoustic amplifier, and the mode-diversity RFAID tag 50 responds to the acoustic interrogation signal by impedance modulating the antenna 52. In an exemplary embodiment of an active audio-to-RF mode-diversity RFAID tag 50, the voltage rectifier/amplifier 56 is an acoustic amplifier that receives the acoustic interrogation signal, and the mode-diversity RFAID tag 50 responds to the acoustic interrogation signal by generating a modulated RF signal. In an exemplary embodiment of a semi-passive RF-to-audio mode-diversity RFAID tag 50, the antenna 52 receives an RF interrogation signal, the voltage rectifier/amplifier 56 is an RF amplifier, and the mode-diversity RFAID tag 50 responds by modulating the impedance of the acoustic transducer 54. In an exemplary embodiment of an active RF-to-audio mode-diversity RFAID tag 50, the antenna 52 receives the RF interrogation signal, the voltage rectifier/amplifier 56 is an RF amplifier, and the mode-diversity RFAID tag 50 responds to the RF interrogation signal by generating a modulated acoustic signal.

As previously mentioned, the mode-diversity RFAID tag 50 and reader 30 may also operate in a combined electromagnetic and acoustic mode. In one exemplary embodiment, the voltage rectifier/amplifier 56 is an acoustic amplifier, the acoustic transducer 54 receives the acoustic interrogation signal, and the mode-diversity RFAID tag 50 responds to the acoustic interrogation signal by impedance modulating a second acoustic transducer and simultaneously impedance modulating the RF transducer or antenna 52. For example, the mode-diversity RFAID tag 50 may create ultrasonic sidebands from an ultrasonic carrier signal. In this embodiment, the mode-diversity RFAID reader 30 selects the reverse path signal (e.g., impedance modulated signal from the second acoustic transducer or the impedance modulated RF transducer) having the highest quality (e.g., using a selective ultrasonic receiver tuned to the ultrasonic sidebands). In another exemplary embodiment, the mode-diversity RFAID tag 50 transmits an actively generated acoustic signal and/or an actively generated RF signal having pulses that fall in between the pulses of the forward-path audio interrogation signal.

In operation, the mode-diversity RFAID tag 50 is preferably located with a desired asset or item, such as adhered to the packaging of the item, and awaits reception of the interrogation signal from the mode-diversity RFAID reader 30. The antenna 52 operates to receive any RF carrier waves of the interrogation signal, and the acoustic transducer 54 (e.g., a piezoelectric transducer) operates to receive any acoustic carrier waves of the interrogation signal. For example, the antenna 52 operates to receive the RF carrier waves of the interrogation signal when the mode-diversity RFAID reader employs the electromagnetic mode or the combined electromagnetic and acoustic mode, and the acoustic transducer 54 operates to receive the acoustic carrier wave of the interrogation signal when the mode-diversity reader employs the acoustic mode or the combined electromagnetic and acoustic mode. Although the processing of the interrogation signal is described in the context of common devices (e.g., rectifier, demodulator, state machine, oscillator, etc.) for simplification, the RF carrier waves may be processed separately from the acoustic carrier waves (e.g., via a separate rectifier, demodulator, state machine, oscillator, etc.).

The antenna 52 of the mode-diversity RFAID tag 50 may be a coil antenna, a dipole antenna, or any antenna designed such that an RF transmission, such as the carrier wave sent by the mode-diversity RFAID reader 30, induces an AC voltage. The design of the antenna 52 may vary with the application type of the mode-diversity RFAID tag 50 and the frequency or frequencies in which the mode-diversity RFAID tag 50 operates. In an exemplary embodiment, the antenna 52 comprises elements for receiving RF signals in multiple frequency ranges (e.g., the low frequency range, medium frequency range, high frequency range, ultra high frequency range, and a microwave range).

The acoustic transducer 54 of the mode-diversity RFAID tag 50 and the acoustic transducer 40 of the mode-diversity RFAID reader 30 may be similarly constructed. In an exemplary embodiment, the acoustic transducers 40, 54 comprise a piezoelectric or piezocomposite element that generates an acoustic wave upon application of a potential across the piezoelectric or piezocomposite element. Upon receipt of an acoustic wave tuned to the frequency of the piezoelectric or piezocomposite element, the acoustic transducers 40, 54 generate an AC voltage. Thus, the acoustic transducers 40, 54 may transmit and receive acoustic signals. The acoustic transducers 40, 54 may operate within one or more acoustic frequency ranges and preferably operate within an ultrasonic frequency range (e.g., 50 kHz to 100 MHz).

To avoid potential false acoustic signaling, the mode-diversity RFAID tag 50 may operate with a Finder Mode such that the mode-diversity RFAID tag 50 wakes-up in the Finder Mode or is commanded into the Finder Mode via a user designation. In the Finder Mode, the mode-diversity RFAID tag 50 responds to an acoustic signal by emitting (e.g., passively or actively) a recognizable Finder Mode coded signal (e.g., four pulses in the RF mode and/or acoustic mode with a sub-carrier frequency, pulse duration, and pulse position) that uniquely identifies the presence of the mode-diversity RFAID tag 50 from a false acoustic signal. In a noisy environment (e.g., due to local RF noise, AF noise, or interference from other readers), the Finder Mode coded signal is simpler to identify in comparison with properly reading a seventy-eight (78) bit tag identification code, for example. Proper reading of the Finder Mode coded signal in a noisy environment may be enhanced by repeating the Finder Mode coded signal transmission from the mode-diversity RFAID tag 50 numerous times (e.g., with an equal code-frame repetition spacing). In this enhancement, the mode-diversity RFAID reader 30 integrates multiple frames of the Finder Mode coded signal such that the Finder Mode coded signal adds coherently and the noise components add incoherently.

In one exemplary embodiment, the semi-passive or active mode-diversity RFAID tag 50 responds to an acoustic interrogation signal with an RF antenna impedance modulation (e.g., when the mode-diversity RFAID reader 30 supplies an RF carrier). In this exemplary embodiment, a microphone (e.g., an electret microphone) and amplifier replace the piezoelectric element. One benefit of this exemplary embodiment is that the electret microphone and amplifier together are substantially smaller in size and have significantly greater sensitivity than a conventional unamplified piezoelectric element. The RF carrier signal supplied by the mode-diversity RFAID reader 30 to the semi-passive mode-diversity RFAID tag 50 during interrogation may be antenna impedance modulated by the mode-diversity RFAID tag 50. This antenna impedance modulated return signal generally has greater signal strength, in comparison with a passive type Tag at a similar range, for reception by the mode-diversity RFAID reader 30 (e.g., exceeds a pre-determined signal reception threshold of the mode-diversity RFAID reader 30).

In another exemplary embodiment, the semi-passive or active mode-diversity RFAID tag 50 responds to an acoustic interrogation signal with an active RF signal generation (e.g., when the mode-diversity RFAID reader 12 is not supplying an RF carrier). In this exemplary embodiment, the processor 32 of the mode-diversity RFAID reader 30 preferably includes Automatic Frequency Control (AFC) signal-tracking capability. The active RF signal generated by the semi-passive or active mode-diversity RFAID tag 50 also generally has a greater signal strength in comparison with the passive type mode-diversity RFAID tag at a similar range.

In addition to having increased return path signal range (e.g., using an antenna impedance modulated return signal and/or an active RF signal), the semi-passive and active type mode-diversity RFAID tags generally operate with less power than the passive type mode-diversity RFAID tag. For example, the semi-passive or active type mode-diversity RFAID tags may be addressed, interrogated, and re-programmed in one of two modes (e.g., RF or acoustic) and respond in the same mode, in the other mode, or simultaneously in both modes with less reader (e.g., RF or AF) power than used in the passive type mode-diversity RFAID tag.

The particular response protocol of the mode-diversity RFAID tag 50 may also increase sensitivity and reduce power consumption. For example, when using a conventional Aloha Protocol (e.g., communication between a reader and a tag without an addressing code or an interrogating code), the passive, semi-passive, and active types of mode-diversity RFAID tags have increased sensitivity to RF signal and/or AF signal reception. Using the Aloha Protocol, the mode-diversity RFAID tag 50 continuously responds, typically with a randomized timing delay, when sensing any RF signal or AF signal above a pre-determined threshold. This increased sensitivity may at least be partially attributed to the reduction in power consumption from a lack of downward amplitude modulation commonly used to perform addressing, or interrogate command, operations.

The passive type mode-diversity RFAID tag 50 is powered by induced voltage. Upon receiving the interrogation signal from the antenna 52, the acoustic transducer 54, or both the antenna 52 and the acoustic transducer 54, the voltage rectifier 56 converts the induced AC voltage to a useable DC voltage that powers the operation of the passive type of mode-diversity RFAID tag 50. For example, as the antenna 52 receives the RF carrier wave from the mode-diversity RFAID reader 30 and/or the acoustic transducer 54 receives the acoustic frequency carrier wave from the mode-diversity RFAID reader 30, the voltage rectifier 56 converts the induced AC voltage to a DC voltage, and the DC voltage increases until reaching a critical voltage that activates the mode-diversity RFAID tag 50.

The semi-passive and active types of mode-diversity RFAID tags 50 are powered by the optional power supply 51, such as a battery, an internal power supply, or an external power supply coupled to the mode-diversity RFAID tag 50. The mode-diversity RFAID tag 50 may contain a photovoltaic cell that charges via a light source on the mode-diversity RFAID reader 30 or via ambient light. In some embodiments, an RF input power of about 100 microwatts or less may be sufficient to operate the mode-diversity RFAID tag 50. The semi-passive and active types of mode-diversity RFAID tags 50 may be charged by a magnetic field, an electrostatic field, or an RF field from any other RF frequency source (e.g., not necessarily from the mode-diversity RFAID reader 30). This RF frequency source may operate on a frequency independent of the tag-reading frequency and may operate with periodic bursts of RF energy (e.g., via a Bluetooth transmitter) to charge the mode-diversity RFAID tag 50 in between reading periods. For example, the magnetic leakage from a ballast transformer of a fluorescent lamp, or other local transformer, may supply an AC magnetic field that wirelessly excites an internal power supply.

In another example, the mode-diversity RFAID tag 50 may respond with an input power of about 10 microwatts by eliminating an internal clock oscillator that generates an address code pointer. In this embodiment, the mode-diversity RFAID tag 50 steps through seventy-eight (78) bits, for example, of the addressing code by detecting the leading edges of the RF carrier amplitude modulated sequential pulses from the mode-diversity RFAID interrogator 30 during a reading function. During each interrogator pulse in this embodiment, the mode-diversity RFAID tag 50 responds with a corresponding antenna impedance sideband modulation (e.g., a logic one), with no sideband modulation (e.g., a logic zero), or with a change in the sideband modulation frequency (e.g., a logic zero).

When the mode-diversity RFAID tag 50 is activated, the demodulator 58 demodulates any incoming interrogation signals received from mode-diversity RFAID reader 30. Although the initial RF carrier wave from the mode-diversity RFAID reader 30 activates and powers the mode-diversity RFAID tag 50, as previously discussed, the mode-diversity RFAID reader 30 may also send data to the mode-diversity RFAID tag 50, such as data used to set the state of the RFAID tag 50.

The state machine 62 can be any device that sets the state of the mode-diversity RFAID tag 50 upon receipt of a proper request or command from the mode-diversity RFAID reader 30. Examples of these states include, by way of example and not of limitation, a read state, a write state, a calibration state, and a command state. The mode-diversity RFAID tag 50 may have other states for different frequency settings, such as for backscatter modulation of the received carrier wave, and for variations in other parameters that affect modulation of the carrier wave of the interrogation signal. The state machine 62 may be implemented using logic circuits, such as programmable logic devices and the like. Additionally, the state machine 62 may be implemented as software running on a processor.

The mode-diversity RFAID tag 50 has a unique identification data associated therewith, and the memory 66 stores this identification data. Additional data may be stored in the memory 66 depending on the application of the mode-diversity RFAID tag 50 including, by way of example and not of limitation, a product identification number, a product description, and the like. The memory 66 is preferably a non-volatile memory. Depending on the application, the memory 66 may be a read-only memory or a read/write memory. In an exemplary embodiment, upon activation of the mode-diversity RFAID tag 50, the state machine 62 retrieves a product identification code stored in the memory 66 and presents this data to the modulator 60 for transmission to the RFAID reader 30.

The mode-diversity RFAID tag 50 responds to the interrogation signal by producing a modulated signal based on the interrogation signal. The oscillator 64 provides a clock signal for the mode-diversity RFAID tag 50. The oscillator 64 may produce a pre-determined based frequency and divides this base frequency into other frequencies using a frequency divider circuit. The clock signal provided by the oscillator 64 establishes the sideband frequency of the modulated carrier wave. In an alternative embodiment of the present invention, the mode-diversity RFAID tag 50 adjusts the accuracy of the oscillator 64 using the carrier wave of the interrogation signal from the mode-diversity RFAID reader 30. In yet another alternative embodiment, the mode-diversity RFAID tag 50 excludes the oscillator 64 and extracts all timing information from the carrier wave of the interrogation signal.

The modulator 60 modulates the carrier wave of the interrogation signal to send the identification data to mode-diversity RFAID reader 30. The modulator 60 employs a variety of modulation means including, but not necessarily limited to, frequency shift key (FSK) modulation, phase shift key (PSK) modulation, and amplitude shift key (ASK) modulation. In an exemplary embodiment, the modulator 60 modulates and backscatters the carrier wave from the mode-diversity RFAID reader 30.

The mode-diversity RFAID system 10 (FIG. 1) is suited to locations that are difficult or undesirable for wired instrumentation, such as on very high voltage wiring, on very high voltage insulators of commercial power transmission systems, inside of a rotating vehicle tire, etc. In one exemplary embodiment, the mode-diversity RFAID tag 50 is a telemetry tag embodiment, and the passive, semi-passive, or active types of telemetry tags placed in such environments can monitor the current on the wiring, current transients, voltage transients, the acoustic noise of a high voltage corona discharge, or the tire pressure, for example. In these applications, the telemetry tag transmits an identification code that at least partially contains the captured data (e.g., current, transients, acoustic noise, tire pressure, etc.). The telemetry tag may be read by RFID, acoustic ID, or a combination of RFID and acoustic ID. The acoustic input portion of the telemetry tag may serve to: address, or singulate, and interrogate the telemetry tag by acoustic ID; and, measure the acoustic noise of the corona discharge or other acoustic noise in the vicinity of the telemetry tag.

Used in a very high voltage transmission system, a telemetry tag may provide an early warning of the salt accumulation on a very high voltage insulator located in a salt spray environment (e.g., near a sea shore) or provide an early warning of arcing, such as may be useful during tree trimming. The early warning indication serves to avoid a very high voltage breakdown by alerting the transmission line maintenance crew to know: when to clean the insulators in the area; or, when to trim the tree. Cleaning the very high voltage insulators prior to such insulators generating noise sufficient to interfere with television reception within the local community generally prevents expensive repairs or power black-outs that may occur in the event of a very high voltage breakdown.

Used in a vehicle tire pressure monitoring system, the telemetry tag is placed within a vehicle tire and measures the tire pressure or wheel bearing noise without requiring an electronic rotary joint or a pneumatic rotary joint. In this exemplary embodiment, the vehicle tire pressure monitoring system identifies potential tire failures and wheel bearing failures.

In a high security application, the mode-diversity RFAID tag 50 is configured to respond upon receipt of a valid addressing and interrogation code in both the RF and AF modes.

Figure 3:
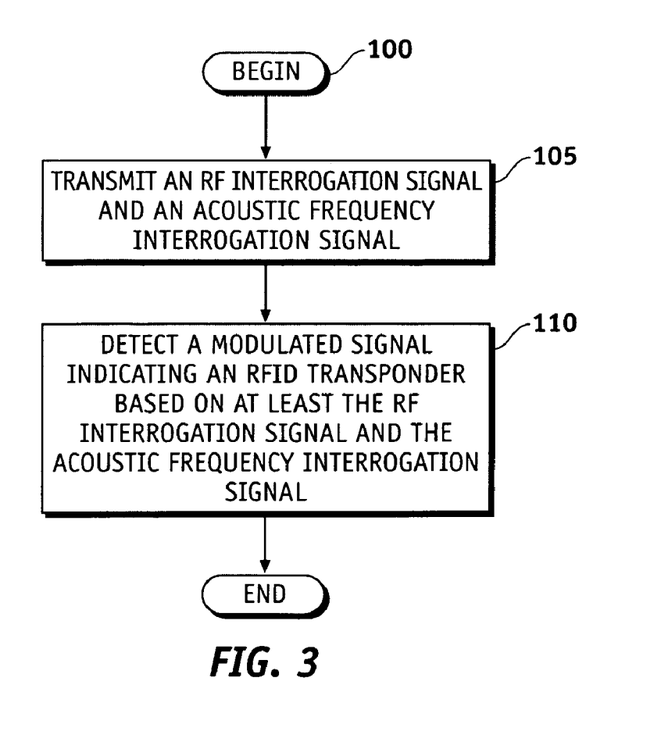
FIG. 3 is a flow chart illustrating a method for detecting an RFAID transponder in accordance with an exemplary embodiment of the present invention.

FIG. 3 is a flow chart illustrating a method for detecting an RFAID transponder in accordance with an exemplary embodiment of the present invention. The method begins at 100. The mode-diversity RFAID reader 30 (FIG. 2) transmits an interrogation signal comprising an RF signal and an acoustic frequency signal at step 105. The mode-diversity RFAID tag 50 (FIG. 2) detects at least one of the RF signal and the acoustic frequency signal from the mode-diversity RFAID reader 30 (FIG. 2). In the event the mode-diversity tag 50 (FIG. 2) detects the RF signal from the mode-diversity RFAID reader 30 (FIG. 2), the modulator 60 (FIG. 2) modulates the RF signal for transmission via the antenna 52. In the event the mode-diversity tag 50 (FIG. 2) detects the acoustic frequency signal from the mode-diversity RFAID reader 30 (FIG. 2), the modulator 60 (FIG. 2) modulates the acoustic frequency signal for transmission via the acoustic transducer 54 (FIG. 2). In the event the mode-diversity tag 50 (FIG. 2) detects the acoustic frequency signal and the RF signal from the mode-diversity RFAID reader 30 (FIG. 2), the modulator 60 (FIG. 2) modulates the acoustic frequency signal and the RF signal for transmission to the mode-diversity RFAID reader 30 (FIG. 2).

The mode-diversity RFAID reader 30 (FIG. 2) detects a modulated signal indicating the RFAID transponder at step 110. In an exemplary embodiment, the transceiver 34 (FIG. 2) scans a plurality of pre-determined RF frequency bands to determine the signal quality for each of the RF frequency bands including, by way of example and not of limitation, determining the presence of a signal from another nearby reader in the RF frequency band. Determining the presence of signals from other nearby readers in each band of RF and/or AF frequencies is particularly useful for a Look Before Transmit (LBT) function of the mode-diversity RFAID reader 30 (FIG. 2). The LBT function generally reduces interference to the reader 30 by determining lower trafficked bands for communication. The processor 32 (FIG. 2) selects a reading mode frequency band from the pre-determined RF frequency bands based on the signal quality. In another exemplary embodiment, the transceiver 34 (FIG. 2) scans a plurality of pre-determined acoustic frequency bands to determine the signal quality for each of the acoustic frequency bands. In this embodiment, the processor 32 (FIG.

2) selects the reading mode frequency band from the pre-determined acoustic frequency bands based on the signal quality. In yet another exemplary embodiment, the transceiver 34 (FIG. 2) scans the pre-determined RF frequency bands and the pre-determined acoustic frequency bands to determine the signal quality for each of the RF frequency bands and the acoustic frequency band. The processor 32 (FIG. 2) selects a first reading mode frequency band from the pre-determined acoustic frequency bands and a second reading mode frequency band from the pre-determined acoustic frequency bands.

In the RFAID system 10 (FIG. 1), the reception of the RF signals (e.g., the RF interrogation signal and modulated RF signal) may be compared with the reception of the acoustic frequency signals (e.g., the acoustic frequency interrogation signal and modulated acoustic signal) to generally increase identification reliability. Additionally, the propagation of acoustic frequency signals generally have a greater operating range than the RF signals, within conventionally regulated conditions, thus generally increasing the operating range of between the mode-diversity RFAID reader 12 (FIG. 1) and the mode-diversity RFAID tag 14 (FIG. 1). Finally, using the acoustic frequency signals minimizes the reflections and absorptions typically associated with RF frequency signal propagation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A radio frequency identification (RFAID) tag comprising:
    a first transducer configured to receive a first radio frequency (RF) signal;
    a second transducer configured to receive an acoustic signal; and
    an impedance modulator coupled to said first transducer and said second transducer and configured to emit a signal identifying the RFAID tag when at least one of said first transducer receives said first RF signal and said second transducer receives said acoustic signal.

2. An RFAID tag according to claim 1, wherein said first transducer comprises a rectification circuit configured to produce an operating voltage for said impedance modulator when said first transducer receives said first RF signal.

3. An RFAID tag according to claim 1, wherein said second transducer comprises a rectification circuit configured to produce an operating voltage for said impedance modulator when said second transducer receives said acoustic signal.

4. An RFAID tag according to claim 1, wherein said first transducer comprises a first rectification circuit configured to produce an operating voltage for said impedance modulator when said first transducer receives said first RF signal; and
    wherein said second transducer comprises a second rectification circuit configured to produce said operating voltage for said impedance modulator when said second transducer receives said acoustic signal.

5. An RFAID tag according to claim 1 further comprising a power source having an input coupled to at least one of said first transducer and said second transducer and having an output coupled to said impedance modulator, said power source configured to produce an operating voltage when one of said first transducer receives said first RF signal and said second transducer receives said acoustic signal.

6. An RFAID tag according to claim 1, wherein said acoustic signal is an ultrasonic signal.

7. An RFAID tag according to claim 1 further comprising a barcode.

8. An RFAID tag according to claim 1, further comprising:
    a third transducer configured to receive one of a second RF signal and a second acoustic signal.

9. An RFAID reader for identifying an RFAID transponder, the RFAID reader comprising:
    a transceiver configured to:
        transmit an RF signal and an acoustic signal;
        receive at least one modulated signal from the RFAID transponder based on at least one of said RF signal and said acoustic signal; and
    a processor coupled to said transceiver and configured to identify the RFAID transponder from said modulated signal.

10. An RFAID reader according to claim 9, wherein said RF signal is selected from a low frequency range from about 30 kHz to about 300 kHz, a medium frequency range from about 300 kHz to about 3 MHz, a high frequency range from about 3 MHz to about 30 MHz, an ultra high frequency range from about 300 MHz to about 3 GHz, and a microwave range of greater than about 3 GHz.

11. An RFAID reader according to claim 9, wherein said RF signal is selected from about 125 KHz, about 13.56 MHz, about 868 MHz, about 915 MHz, about 2.45 GHz, and about 5.6 GHz; and
    wherein said acoustic signal is selected from a sub-sonic, a sonic, and an ultrasonic signal.

12. An RFAID reader according to claim 9, wherein said transceiver is further configured to:
    scan at least one electromagnetic frequency band for the RFAID transponder; and
    select a reading mode frequency band based on said at least one electromagnetic frequency band.

13. An RFAID reader according to claim 9, wherein said modulated signal is based on said acoustic signal; and
    wherein said transceiver comprises at least one of a piezoelectric transducer, an electret microphone, and a pressure transducer for converting said modulated signal to a data signal indicating the RFAID transponder.

14. An RFAID reader according to claim 9, wherein said transceiver is further configured to:
    receive a first modulated signal, said first modulated signal based on said RF signal; and
    receive a second modulated signal, said second modulated signal based on said acoustic signal; and
    wherein said processor is further configured to identify the RFAID transponder from at least one of said first modulated signal and said second modulated signal.

15. An RFAID reader according to claim 9 further comprising an optical scanner coupled to said processor, said optical scanner configured to read a barcode; and
    wherein said transceiver is further configured to:
        scan at least one acoustic frequency band for the RFAID transponder; and select a reading mode frequency band based on said at least one acoustic frequency band.

16. A method for detecting an RFAID transponder, the method comprising the steps of:
- transmitting an RF signal and an acoustic signal; and
- detecting a first modulated signal indicating the RFAID transponder, the first modulated signal based on at least one of the RF signal and the acoustic signal.

17. A method for detecting an RFAID transponder according to claim 16, wherein the first modulated signal is based on the RF signal; and further comprising the step of:
- detecting a second modulated signal indicating the RFAID transponder, the second modulated signal based on the acoustic signal.

18. A method for detecting an RFAID transponder according to claim 16, wherein said first modulated signal detecting step comprises the steps of:
- scanning a plurality of pre-determined RF frequency bands; and
- selecting a reading mode frequency band from the plurality of pre-determined frequency bands.

19. A method for detecting an RFAID transponder according to claim 16, wherein said first modulated signal detecting step comprises the steps of:
- scanning a plurality of pre-determined acoustic frequency bands; and
- selecting a reading mode frequency band from the plurality of pre-determined acoustic frequency bands.

20. A method for detecting an RFAID transponder according to claim 16, wherein said first modulated signal detecting step comprises the steps of:
- scanning a plurality of pre-determined RF frequency bands;
- scanning a plurality of pre-determined acoustic frequency bands; and
- selecting a first reading mode frequency band from the plurality of pre-determined acoustic frequency bands and a second reading mode frequency band from the plurality of pre-determined acoustic frequency bands.

* * * * *